United States Patent [19]

Brouwer

[11] 3,896,851
[45] July 29, 1975

[54] INTEGRATED MODULAR FLUID LOGIC ARRAYS DISPLAYING DYNAMIC CIRCUIT OPERATING CONDITIONS

[75] Inventor: Charles William Brouwer, East Greenwich, R.I.

[73] Assignee: Leesona Corporation, Warwick, R.I.

[22] Filed: Jan. 28, 1974

[21] Appl. No.: 436,941

[52] U.S. Cl. ............................................. 137/557
[51] Int. Cl.² ......................................... G06D 1/12
[58] Field of Search ..... 137/557, 559; 235/201 ME; 116/70

[56] References Cited
UNITED STATES PATENTS

| | | |
|---|---|---|
| 3,156,157 | 11/1964 | Smith et al............... 235/201 ME X |
| 3,610,274 | 10/1971 | Levesque et al.................... 137/559 |
| 3,768,521 | 10/1973 | Brychta et al. .......... 235/201 ME X |
| 3,834,346 | 9/1974 | Cowan................................. 116/70 |

Primary Examiner—Henry T. Klinksiek
Attorney, Agent, or Firm—Albert P. Davis; Burnett W. Norton

[57] ABSTRACT

Dynamic operating conditions of a fluid logic integrated circuit module are shown on a front panel circuit schematic diagram with dynamic pressure indicators located for viewing at monitored schematic circuit positions to provide diagnostic information for servicing or monitoring a system sequence. The module comprises a sandwich array of two logic element plate layers with an intermediate taut flexible elastomer diaphragm layer common to a plurality of logic elements spaced on the two logic plates with mating cavity wells for the individual logic elements disposed on opposite sides of the diaphragm. Adjacent one logic element plate is the pressure indicator panel having a foam layer common with a plurality of indicator units, which are connected to preselected monitor points in the module to display the states of the elements and the pressure conditions of the supply fluid sources or input and output channels. A back panel includes a visual circuit connecting diagram for the particular custom circuit showing where to connect hoses between various modular access channels, so that the systems can be connected and put into service on-site by unskilled personnel. A set of indicators thus connected into any particular circuit design is set apart for viewing in position on a schematic circuit overlay on the front panel which blocks out the unused indicators in the module.

10 Claims, 8 Drawing Figures

3,896,851

PATENTED JUL 29 1975

SHEET 1

INTEGRATED MODULAR FLUID LOGIC ARRAYS DISPLAYING DYNAMIC CIRCUIT OPERATING CONDITIONS

BACKGROUND OF THE INVENTION

This invention relates to fluid logic systems and more particularly to integrated modular arrays of fluid logic elements of the taut flexible diaphragm type responsive to control fluid flow paths by means of differential pressure conditions on opposite sides of the diaphragm.

Fluid logic elements of the above type are well known in the art. For example, assigned to the assignee of this invention are patents and applications for various logic elements and circuit configurations including the following:

(1) Pressure state indicators for logic elements, Ser. No. 289,578 filed Sept. 15, 1972, now U.S. Pat. No. 3,834,346 by Larry C. Cowan; (2) Flip-Flop memory type elements; Ser. No. 349,635, filed Apr. 9, 1973, now U.S. Pat. No. 3,789,684 by Larry C. Cowan et al.; (3) Various sorts of logic element structural and circuit configurations, Ser. No. 413,873 filed Nov. 8, 1972 by Larry C. Cowan.

To avoid complexity of this application, the subject matter of these referenced cases which form part of the disclosure herein is briefly referred to herein.

STATUS OF THE PRIOR ART AND OBJECTS OF THE INVENTION

In general the prior art logic elements have been individual units each designed as a valve to control one or two flow paths with a diaphragm positioned in response to the pressure differential condition on opposite sides of the diaphragm. Systems or subsystems can be readily constructed of such elements with interconnected flow path circuits operable to produce complex control sequences. One such example is three-way or four-way valve structures, as set forth in Ser. No. 349,451 filed Apr. 9, 1973, now U.S. Pat. No. 3,812,881 by Ernest D. Anderson et al.

However, the use of individual logic elements which must be interconnected by flexible hoses or long pipes to other parts of a system has led to certain types of failure patterns. The logic elements are quite reliable but hoses tend to leak when subjected to wear or vibration, and the desired pressure conditions may be modified by pinching, resistance and capacitance effects when conduits are long and changes in flow conditions caused by variations of ambient conditions.

Also for complex systems, interconnection haywire can be difficult to connect and becomes extremely difficult to trace in servicing malfunctions. In general design, construction and maintenance of the systems has been a specialty art limited to skilled engineers so that it has been difficult to introduce these systems in remote locations where there are only relatively unskilled personnel for installing, operating and maintaining equipment of this type.

Therefore it is a general object of this invention to provide improved fluid logic systems solving the foregoing problems.

BRIEF DESCRIPTION OF THE INVENTION

To a considerable extent the space and interconnection problems are alleviated by providing custom made integrated circuit arrays in a grouped location on a control panel. The circuit arrays are integrated type modules constructed in a sandwich form of several layers with short manifold interconnections and a common diaphragm for a plurality of logic elements held between two apertured logic plates defining the cavity wells for the respective logic elements connected in the system. Also, the installation and servicing problems are alleviated by fitting on the sandwich array a front viewing panel with a set of dynamic pressure indicators connected to predetermined circuit monitoring points. These have worked well for standard systems that are mass produced since complex dies may then form the system panels cheaply.

There is a further need however for extending these concepts to produce a completely flexible inexpensive standard universal system assembly that can be used in a large number of different circuit configurations, which still can be simply installed, operated and maintained by unskilled personnel.

Thus, a more specific objective of the invention is to provide universal integrated modular fluid logic arrays that can be simply interconnected, installed, monitored and serviced.

The foregoing and additional features, advantages and objectives of the invention as set forth throughout this specification are realized in an integrated module of fluid logic elements formed in a sandwich array of laminar plates stacked on opposite sides of an elastic diaphragm film.

On the front face of the array is a set of dynamically viewable pressure indicator panel unit areas coupled to pressure sensitive circuit monitoring conduit points. A laminar opaque film covers the array to block out those indicator units not used and to show each one used in its proper functional position in a custom circuit diagram to which the universal module is conformed.

On the back panel is a set of apertures which are used to interconnect the module into a circuit pattern and providing access to external signal and power sources and utility devices. A custom circuit diagram corresponding to to that on the front panel overlays the back panel to show the hose interconnection layout for the desired custom circuit configuration.

The intermediate sandwich layers may include feed through apertures and manifolds directly interconnecting several separate logic elements into sub-system arrays such as three-way and four-way valves, OR, AND, NOT and Memory logic circuits, for example. Also the configurations of the available logic elements may differ in size or shape to provide for available fast switching times, pulse response, linear amplification, different operating characteristics such as power control functions or other logic features including those set forth in the above identified application Ser. No. 413,873.

THE DRAWING

The foregoing features representative of the nature of the invention are described hereafter with reference to the preferred embodiments illustrated in the accompanying drawing, wherein.

THE MODULE ASSEMBLY

Figure 1:
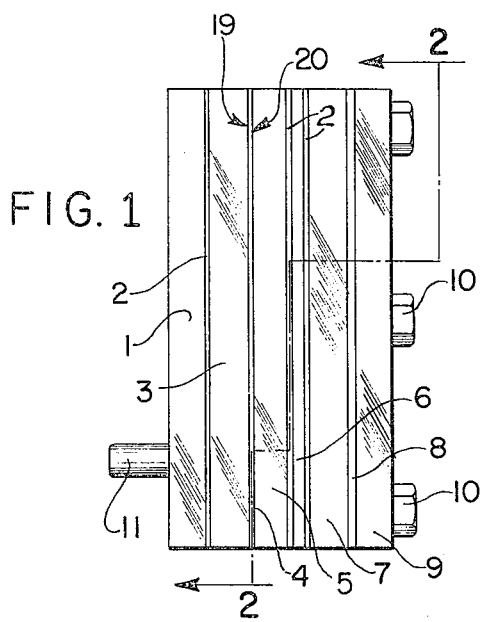
FIG. 1 is an elevation view of an assembled modular logic sandwich array afforded by this invention.
Figure 2:
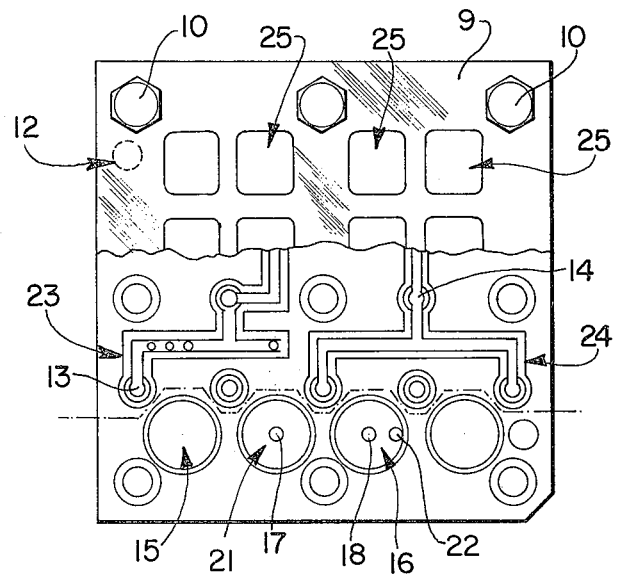
FIG. 2 is a plan view of the array of FIG. 1 cut away along the section lines 2—2.
Figure 3:
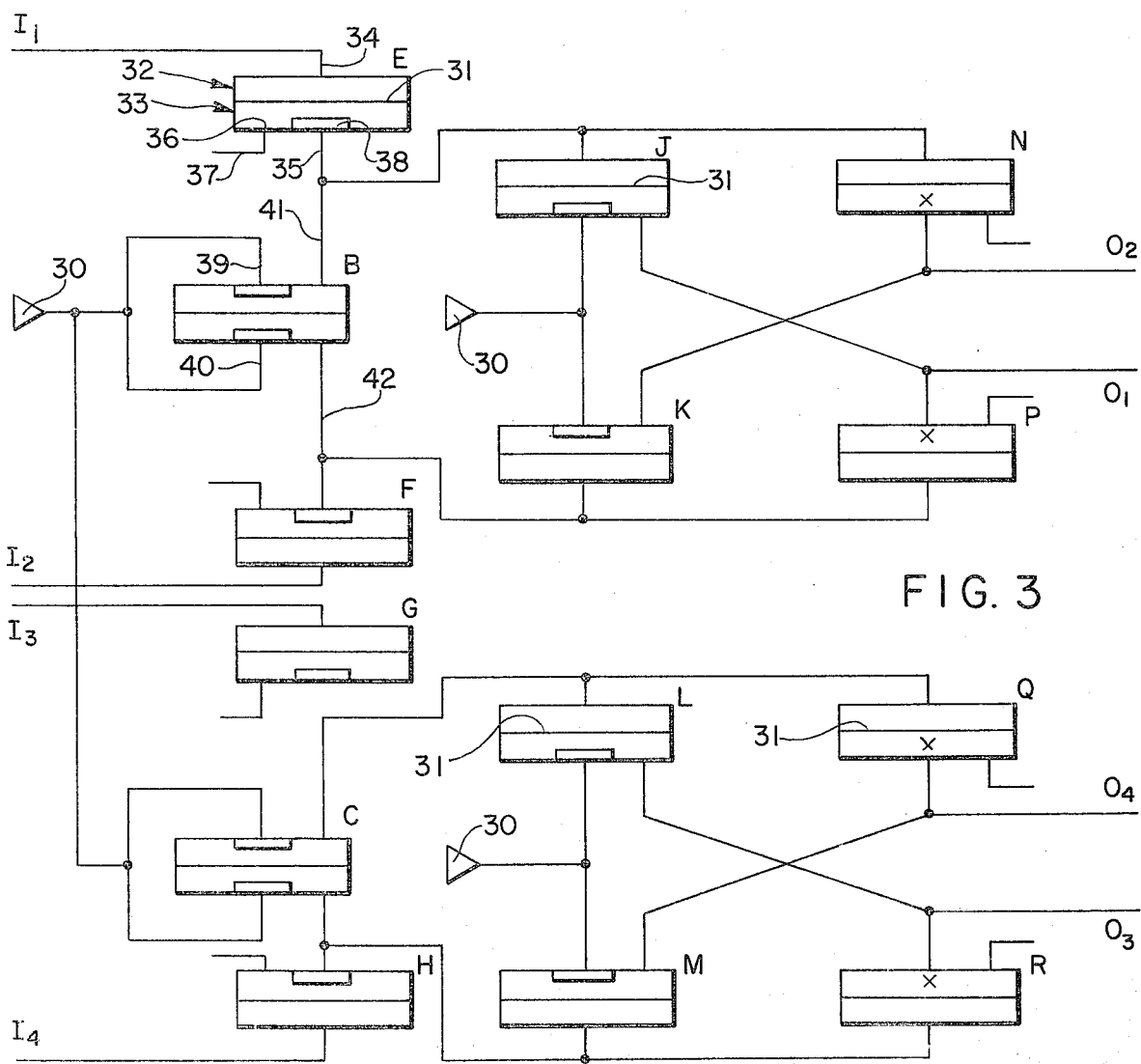
FIG. 3 is a logic schematic diagram of a typical circuit of interconnected fluid logic elements.

As may be seen in FIGS. 1 and 2, a plurality of laminations 1 to 9 may be held together by bolts 10 and registered by dowel keys 11 and 12 to form a modular fluid logic array comprising a set of interconnected fluid logic elements for a system such as shown in schematic form in FIG. 3.

Figure 4:
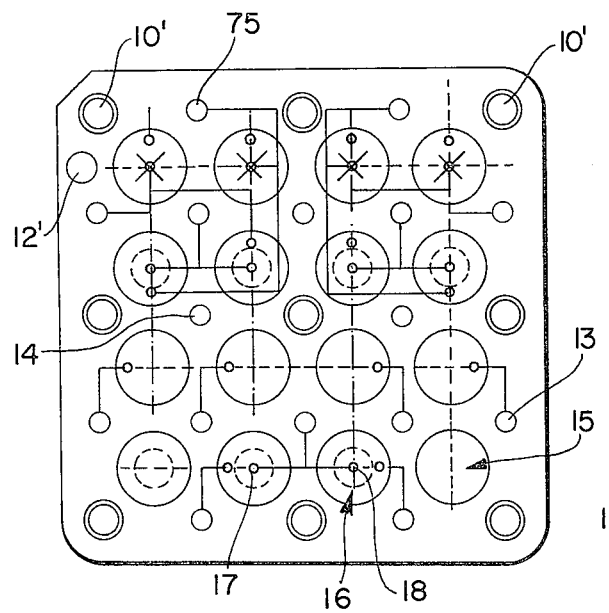
FIGS. 4 and 5 are respectively typical top and bottom modular logic element manifold plate layouts in schematic form for respective mating apertured logic plates which hold the diaphragm therebetween.

The back plate 1 is apertured to provide for external and internal element connections to a plurality of fluid conduits providing for example, the sixteen apertures 75 set forth in FIG. 4. Thus, the module may be connected to external signal or utility means and to a source of fluid such as air at a typical pressure of 80 psi which represents one of two binary logic conditions 0 and 1, the other being atmospheric pressure.

Laminations 2 are apertured gaskets to prevent leakage between the plastic or metal adjacent plates thereby confining fluid flow paths to desired front-to-back axial passageways 13, 14, etc., through respective laminations 1 to 7. Some paths may be blocked if desired by any one of the gaskets 2. Similarly the lamination 4 is a flexible elastomer diaphragm that may also include aperture conduits therethrough, but which is held taut between two mated opposed wells 15, 16, etc., of any one logic element. The diaphragm portion, held between the opposed wells of each logic element, is impervious to respond to pressure differences on opposite sides of the diaphragm and thus control fluid flow paths through the respective passages 17, 18, etc., located in the center of the wells. The offset passageways such as 22 are not controlled by the diaphragm.

Thus, on the opposed faces 19, 20 of logic plates 3 and 5 are molded or machined a pattern of, for example, sixteen logic element well cavities 15, 16, etc., as shown by FIGS. 2, 3 and 4. The well cavities may be of different shape, depth or aperture configuration as typically required for different types of logic operations. For example, large apertures may be required for power elements, and some wells such as 21 may not require offset outlet ports 22.

On the opposite sides of the logic plates are manifold passageways 23, 24, etc., which provide short reliable and efficient circuit interconnections between the individual logic circuit elements by way of their apertured wells. Patterns differ for particular internally connected custom circuit configurations. These manifolds have an open top sealed by gaskets 2 except for those desired inter-lamination apertures such as 13 which pass through the gaskets. A sealing plate 6 would complete the array if an indicator panel is not used.

With indicators, the sealing plate 6 is apertured to convey fluid from a selected set of monitored points in the circuit into a set of rectangular cavities in an indicator plate 7 which preferably has a white background. A special elastomer foam lamination layer 8 preferably black as described in the above mentioned application Ser. No. 289,578, now U.S. Pat. No. 3,834,346, has slits which open, with high fluid pressure and close with low fluid pressure to provide a display of the contrasting white background of the cavity in plate 7 when the pressure is at the higher one of two logic levels as may be viewed by the display areas 76, and 77 on FIG. 6. The indications are viewed through a transparent front panel 9 at the positions shown by unit panel viewing areas 25. The panel 9 seals the foam layer 8 in place for each indicator unit by squeezing it against corresponding square or rectangular cavities surrounded by sealing ridges thereby defining each indicator viewing area 25. A short channel by an aperture into each of the indicator cavities from a selected circuit monitoring point, such as the manifold 23, for example, connects the dynamic monitor for visibly viewing changes of pressure stated therein. A representative group of display indicators 25 may have selected monitoring positions at enough key circuit positions to provide an indication of the particular type of failure that might be encountered in that circuit. The indications can also be used to determine the steps of a sequence being performed in the circuit, or that step at which the sequence is stopped.

The schematic diagram of FIG. 3 displays a typical circuit schematic diagram of an arrangement that can be laid out on a panel of about 9 square inches in the manner heretofore described. Thus, two four-way valve circuits with respective low power logical input point pairs $I_1$, $I_2$ or $I_3$, $I_4$ provide respective output power drive pairs $O_1$, $O_2$ or $O_3$, $O_4$ such as for control of a bi-directional pneumatic cylinder. Fluid power flow sources at a constant pressure such as 80 psi are represented by triangles 30.

The manifolds and logic elements of FIG. 2 may be constructed and laid out to conform with such a schematic circuit diagram where the lines in FIG. 3 represent in each case a fluid flow path interconnecting the various terminal circuit points.

Figure 5:
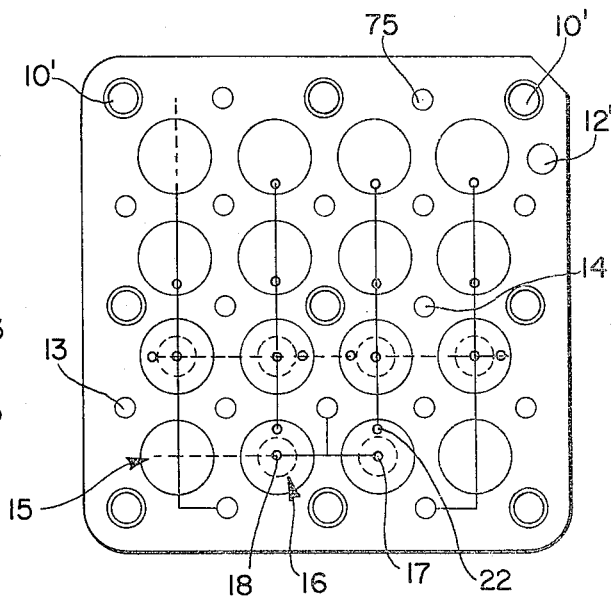

FIGS. 4 and 5 represent top and bottom logic plate layout sketches superimposed with line manifold connections for typical circuit configurations such as set forth herein. The dots represent aperture positions in the respective wells of logic elements A, B, etc., and the dotted circle or X notation, the well pedestal configuration. For example the X wells have larger fluid channels to operate as power control gates. Each of the axial access apertures 13, 14, etc., provide communication channels proceeding through the plates and terminating on the back panel for connection of hoses or plugs, etc., to thereby supply fluid flow paths to output circuits and from sources and input circuits. Apertures 10' and 12' receive the assembly bolts 10 and alignment keys 12.

Input signals to operate one of the logic units thus may be passed through aperture 13 to the well of the top plate in FIG. 4 as shown, and similarly these apertures may be used to convey output signals to the back plate for connection to utility means. In general as shown by FIG. 3 a sub-system logic function of standard or custom nature can be performed in each modular array if the wells and manifold connections are conformed. In the case of FIG. 3 only fourteen of the logic elements are used and thus two wells (such as 15 in FIGS. 2 and 5) would not be used in a sixteen well layout.

In FIG. 3, each logic element B, C, etc., is represented schematically to show a flexible impervious taut diaphragm 31 sandwiched between two wells 32, 33 so that it will flex to control flow of fluid through the opposing centrally located outlet ports coupled with lines 34, 35, etc. An offset outlet port 36 which is not controlled by flexing of the diaphragm may be vented to atmosphere as shown by line 37. Pedestals 38 may indicate internal structure of the cavity well which modifies operation to provide fast switching, amplification, or other operating characteristics as described in the above mentioned application Ser. No. 413,873.

Elements E and F (FIG. 3) may serve as isolating valves where closed cavities 32 can receive a fluid pressure signal from a different system along lines $I_1$ or $I_2$. Thus a steady state pressure condition or temporary pressure change waveform pulse will flex the diaphragm 31 to close against pedestal 38 and prevent fluid flow through cavity 33 and out vent 37. Thus, input pulses are provided at $I_1$ or $I_2$ for setting flip-flop circuit element B to one memory state. The flip-flop 13 operates in the manner described in the above mentioned Ser. No. 349,635, with pressure source 30 supplying along leads 39, 40 a force to hold the diaphragm sealed against one of the pedestals until the memory is reversed with an input pulse from one of the input gates E or F. Thus, an output pressure flow is conveyed from source 30 to one or the other line 41, 42 to control the valve network J, K, N, P, for example and cause one of the respective $O_1$, $O_2$ outlet lines to receive fluid flow at the source pressure and the other to be vented to atmosphere.

This constitutes a four way valve circuit operating in the manner described in Ser. No. 349,451 filed Apr. 9, 1973, by Ernest D. Anderson et al.

Other types of circuit configurations may be constructed in a similar manner to provide a desired operating sequence and set of output conditions from input control signals.

The foregoing type of modular circuit configuration may be designed efficiently for various types of subsystems or useful circuit combinations, by laying out desired patterns of wells and manifolds as shown in FIGS. 2, 4 and 5 and thus may be efficiently reproduced at low cost if used in production quantities.

However, many different circuit variations may be desired in control systems of practical use. Therefore it is desirable to have available low cost universal integrated circuit elements that can be easily connected to form custom system circuit configurations. One such possible arrangement is shown schematically in FIG. 8 where the four-way valve power output modules are shown schematically in conventional valve notation at blocks 45, and other circuit configurations are connected in corresponding blocks 46 to 50 respectively illustrative of three-way valve power output modules, AND, OR, memory and NOT circuits. This type of layout will have enough elements ready in a standard modular array to provide the necessary interconnections for a large variety of circuit configurations.

Figure 6:
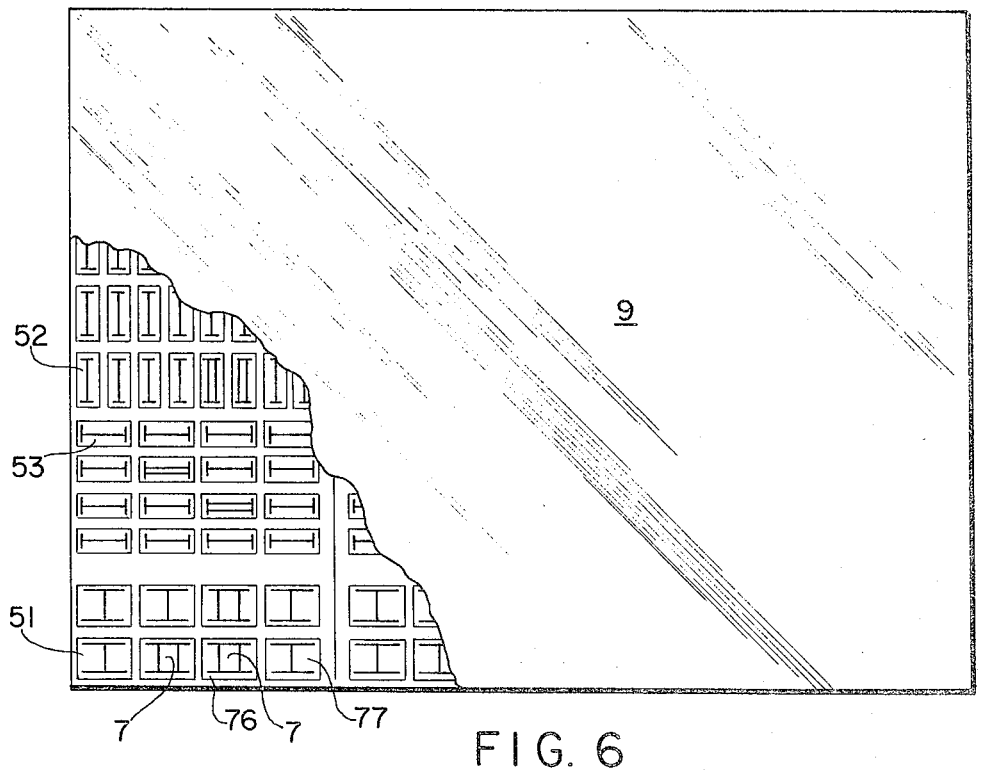
FIG. 6 is a typical elevation view of a control panel with an uncovered modular indicator display face showing a set of dynamic pressure indicators.

As may be seen in FIG. 6 a front panel layout may have an indicator face of the nature before described. It is desirable to have different size rectangular indicating panels 51 and 52 for example and to have the length axes disposed in different directions as in 52, 53 for example. This visually presents information more readily interpreted as to origin or circuit position.

Figure 7:
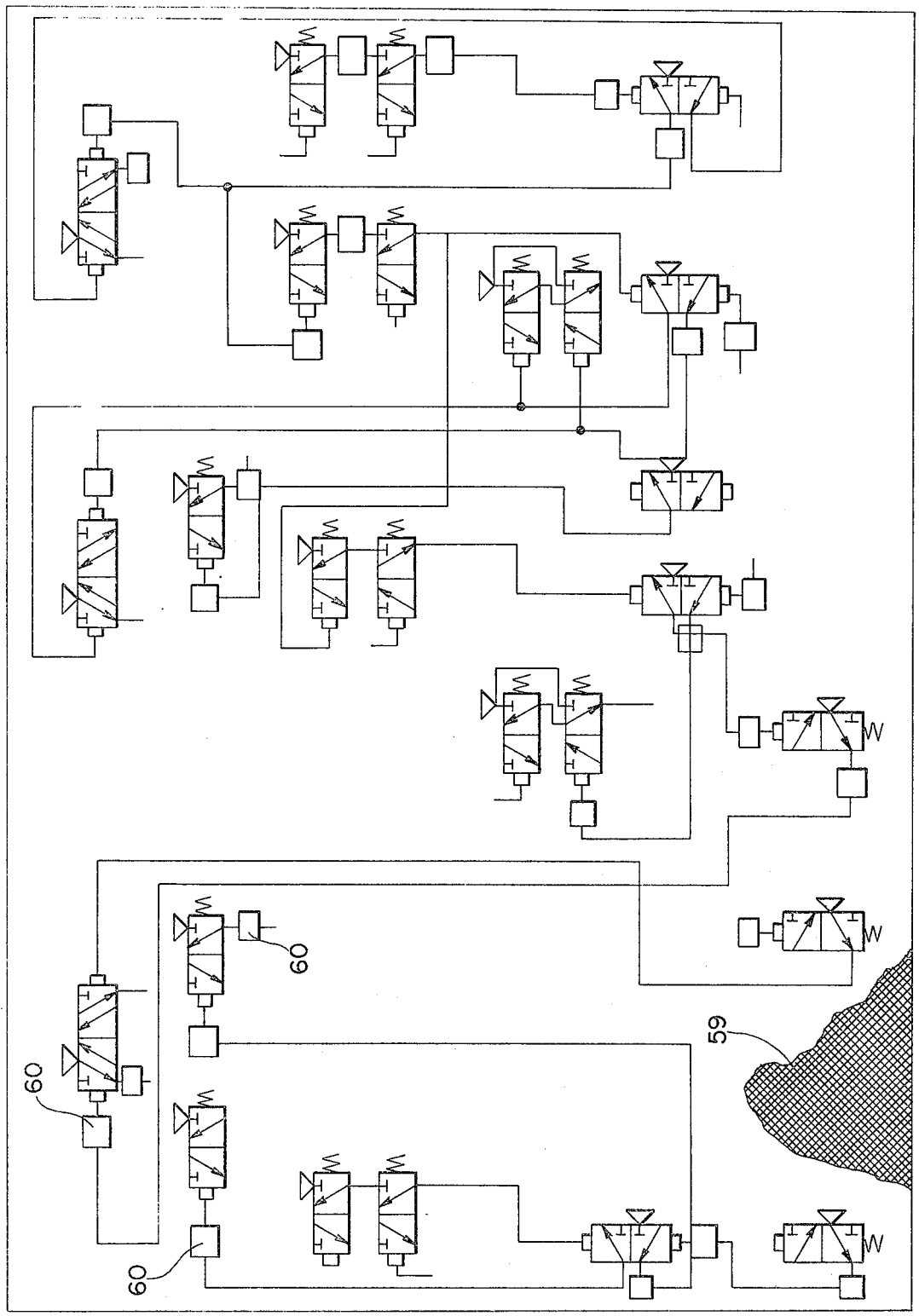
FIG. 7 is a typical elevation view of the control panel of FIG. 6 with a schematic overlay in place for a particular circuit configuration.
Figure 8:
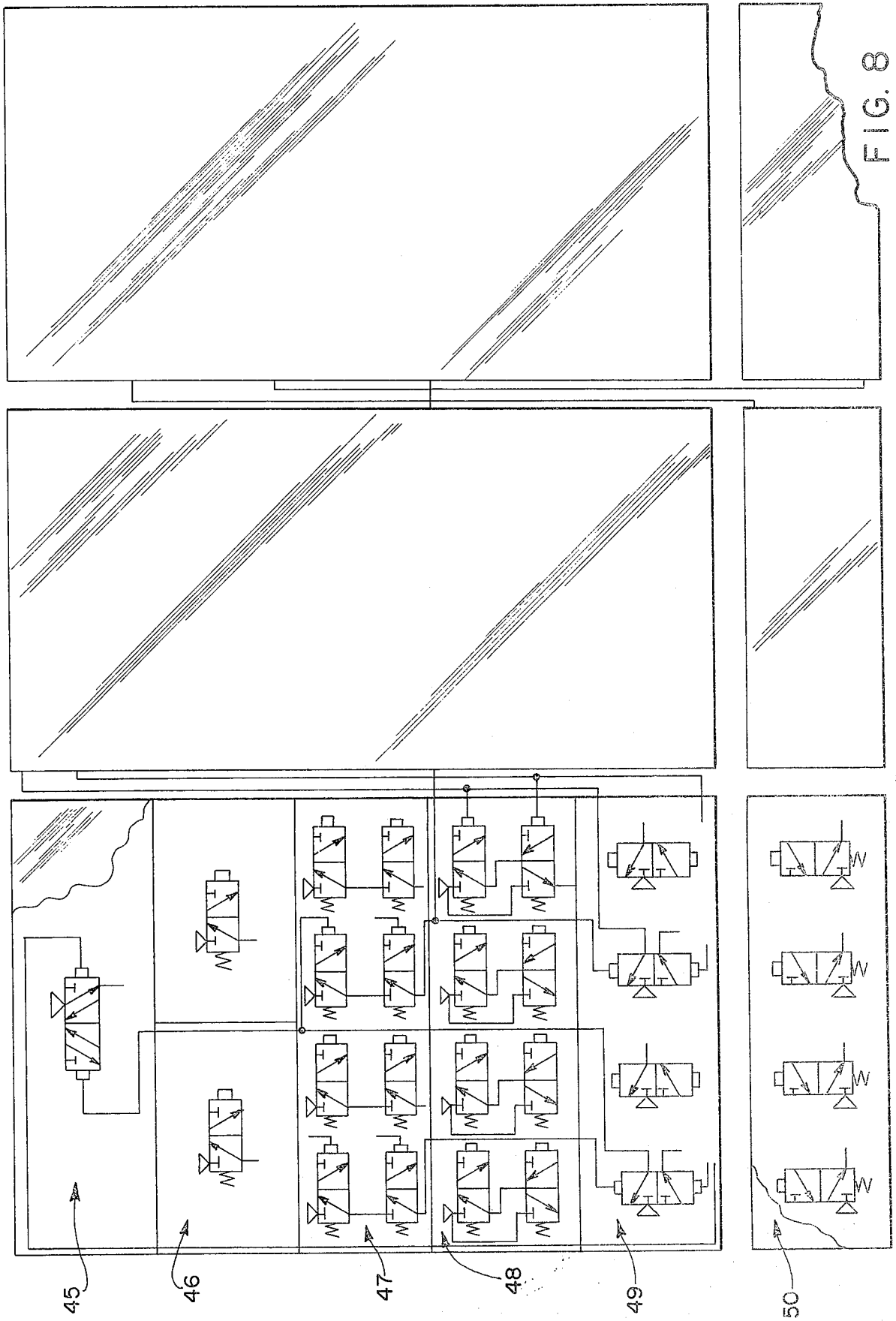
FIG. 8 is a typical rear panel view of the layout overlay for showing connection patterns of logical circuit configurations in a modular array as illustrated by FIG. 9.

As may be seen by comparison of FIGS. 6 to 9 (FIG. 8 representing the logic element construction panels), several layers of the same size may be modularly stacked in the manner heretofore described with the other manifolding and gasket panels, etc., provided where desired. In FIGS. 6 to 9 three sets of similar modules to those shown in more detail in FIGS. 6, 8 and 9 might be used, or other modular variations could be substituted, if desired. In this arrangement, the control system may be panel mounted with the front panel overlay layer shown in FIG. 7 and the rear panel layer in FIG. 9. These overlays may be adhesively affixed to the front and rear panels in the field. It is important to use a visibly opaque layer as shown in FIG. 7 by hatching 59 with those transparent viewing windows 60 etc., in their functional position in a circuit diagram to display the indicators in use in a custom system for which the modular array is interconnected. This configuration of FIG. 7 is particularly helpful in monitoring and servicing the system, and the overlays may be supplied to the field along with the back panel connection chart of FIG. 9 by circuit design engineers for connecting up standard modular assemblies into the desired circuit configuration by unskilled field personnel.

Figure 9:
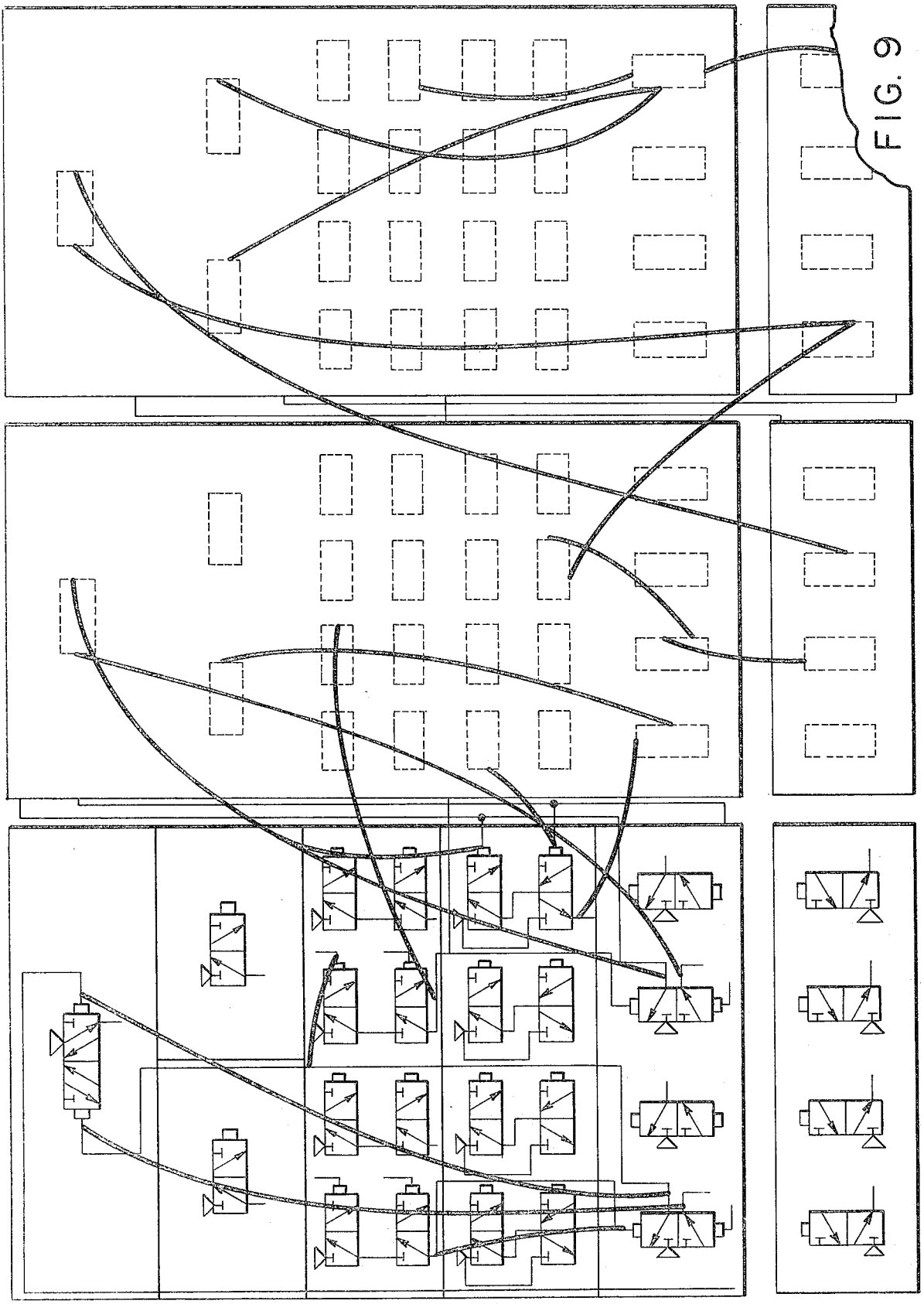

The chart of FIG. 9 may overlay an apertured rear connecting panel of the type described and give access to or plug the various connection points. The connections for the custom circuit are defined by the circuit cables or tubes illustrated in FIG. 9, thereby showing exactly how to make the circuit connections.

It is clear from the foregoing that this invention provides a modular integrated universal circuit panel approach to fluid logic systems that simplifies construction and facilitates maintenance while preserving the features of low cost mass production of standardized units. Thus, those features of novelty descriptive of the spirit and nature of the invention are set forth with particularity in the appended claims.

What is claimed is:

1. A fluid logic system comprising in combination, a plurality of fluid logic elements of the flexible diaphragm type laid out in a modular circuit sandwich array with a common elastically deformable diaphragm held between two opposed apertured logic plates defining respectively two mating cavity wells for each of said logic elements on opposite sides of the diaphragm and with said logic plates holding said diaphragm tautly therebetween, a manifold plate defining a plurality of fluid flow paths for conveying fluid to said wells of the logic elements disposed on the opposite side of at least one said logic plate and including a display plate disposed as an outer element in said sandwich array for visual observation, said display plate comprising a plurality of pressure indicators each connected by a fluid conveying passageway to a different one of the fluid paths on said manifold plate, to thereby present a set of visible indicia of the pressure conditions of predetermined circuit monitoring points.

2. A system as defined in claim 1, wherein at least some of said pressure indicators have substantially rectangular panel viewing areas of greater length than width and arranged to substantially cover the display plate area.

3. A system as defined in claim 1, wherein at least two different ones of said pressure indicators have viewing areas of different size.

4. A system as defined in claim 3, wherein respective ones of said viewing areas are laid out with different orientation directions along the length of the rectangular panels.

5. A system as defined in claim 1, having an opaque overlay on said display plate blocking out selected indicators from view.

6. A system as defined in claim 5, wherein said opaque plate has visibly embodied thereon a schematic circuit diagram showing interconnections between said circuit configurations with respective unblocked indicators disposed in that schematic circuit position on the diagram showing the functional location of the monitored pressure point.

7. A system as defined in claim 1, having a back cover plate opposite said display plate and defining therein a plurality of circuit access apertures coupled to passageways for conveying fluid to said logic elements, whereby different circuit connections can be made between said logic elements by interconnecting said access apertures into a selected circuit array.

8. A system as defined in claim 7, having an overlay plate over said back cover plate providing access to selected ones of said circuit access apertures, and having an interconnection diagram displayed thereon identifying interconnection paths between said access apertures for a predetermined circuit configuration.

9. A system as defined in claim 1, wherein at least two cavity wells of different logic elements on one of said logic plates have different shapes.

10. A system as defined in claim 1, wherein a plurality of apertures are defined in the logic plates terminating in said wells, and wherein said apertures are of at least two different sizes.

* * * * *